United States Patent Office
3,657,248
Patented Apr. 18, 1972

1

3,657,248
CONDITIONING PROCESS FOR PRODUCING
BETA PHASE QUINACRIDONE
Anthony P. Wagener, Park Forest, Ill., assignor to The
Sherwin-Williams Company, Cleveland, Ohio
No Drawing. Continuation-in-part of application Ser. No. 658,663, Aug. 7, 1967, now Patent No. 3,547,926.
This application Aug. 27, 1970, Ser. No. 67,564
Int. Cl. C07d 39/00
U.S. Cl. 260—279 R                 10 Claims

ABSTRACT OF THE DISCLOSURE

This invention comprises a process for "conditioning" quinacridone to produce the beta-phase by milling the quinacridone with an inorganic salt such as sodium chloride, at a temperature in the range of 100–175° C., preferably 100–150° C., in the presence of a non-solvent liquid. This beta-phase is violet in color and has a characteristic X-ray diffraction pattern distinguishing it from other forms of the quinacridone. The conditioning process of this invention can be applied even to quinacridone of the other phases to produce the beta-phase. The conversion to the beta phase by grinding at these temperatures can be effected even in the presence of solvents, such as dimethylformamide, which have been reported as effecting the formation of a gamma phase quinacridone.

This application is a continuation-in-part of copending application Ser. No. 658,663, filed Aug. 7, 1967, issued Dec. 15, 1970, as Pat. No. 3,547,926.

This invention relates to a process for the production of beta-phase quinacridone. More specifically it relates to a process for "conditioning" various phases of quinacridone to produce the beta-phase. Still more specifically, it relates to a process of conditioning linear quinacridone by milling the quinacridone with an inorganic salt at a raised temperature.

It has been known that linear quinacridone which is represented by the following structural formula:

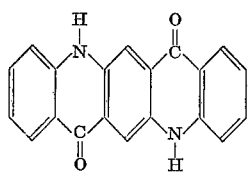

can be produced as pigments in a number of crystal phases which exhibit different X-ray diffraction patterns. While other crystal phases are known, the alpha, beta and gamma phases are more common.

One alpha phase in small particle size is defined by X-ray diffraction in U.S. Pat. 2,844,484 as characterized by two intense lines quite close together with interplanar spacings of 3.46 A. and 3.19 A., a third line of similar intensity with an interplanar spacing of 14.24 A., two lines of moderate intensity with interplanar spacings of 6.32 A. and 7.13 A., and two weak lines with interplanar spacings of 5.30 A. and 4.27 A. This is a bluish red pigment of excellent strength and intensity and is the easiest of the three phases to obtain.

2

Another alpha phase is defined in U.S. Pat. 3,259,630 as having lines of strong intensity at interplanar space of 14.3 and 6.37 A.; three strong to medium reflections at 3.44, 3.37 and 3.23 A.; three medium strong reflections at 3.54, 3.31 and 3.16 A., and four weak reflections at 7.16, 6.15, 5.54 and 3.72 A.

The beta phase is characterized by five well-defined lines corresponding to interplanar spacings of 15.23 A., 7.55 A., 5.47 A., 4.06 A. and 3.31 A. The lines with interplanar spacings of 15.23 A. and 3.31 A. are characteristically much stronger than the other three. This product is a violet pigment of excellent intensity and strength, exhibiting a high degree of resistance to change under various conditions. This is a valuable pigment by itself and also as a blending agent for use with blue pigments to obtain reddish hues.

The gamma phase is defined according to U.S. Pat. 2,844,581 as characterized by three strong lines with interplanar spacing of 13.58 A., 6.41 A. and 3.37 A.; and three relatively weak lines having interplanar spacings of 5.24 A., 4.33 A. and 3.74 A. This is a bluish red pigment of excellent strength and intensity and of outstanding resistance to change either on exposure to the elements, to solvents, or to chemical reagents.

Another gamma phase which is yellowish red is characterized in U.S. Pat. 3,074,950 as having three strong lines at 6.5°, 13.7° and 26.4°; three medium lines at 13.1°, 13.3° and 23.8°; and three weak lines at 17.0°, 20.5° and 25.0°.

A delta phase is described in U.S. Pat. 3,272,821 as having a reddish color and being characterized by a very strong line at 13.6 A.; strong lines at 6.41 A. and 6.75 A.; medium lines at 3.34 A., 3.37 A. and 6.63 A.; and weak lines at 2.81 A., 2.95 A., 3.12 A., 3.18 A., 3.55 A., 3.74 A., 4.11 A., 4.36 A. and 5.23 A.

These quinacridones are desirable for use as pigments in paints, enamels, lacquers, plastics, etc., particularly because of their non-bleeding color, tinctorial strength, light fastness and durability for outside use with respect to gloss, film integrity and bronzing.

Since the crude quinacridones have little color value it is necessary to alter them to a suitable physical form, particularly with regard to particle size and shape in order to develop the desired pigmentary properties. This conditioning process can be carried out in several ways, a grinding or milling operation being commonly employed. It has been found that the addition of certain solvents having phase directing properties in the conditioning operation makes it possible to control the crystal form of the produced pigment.

For example, U.S. Pat. 2,844,484 teaches that the dry milling of linear quinacridones with an inorganic salt such as sodium chloride produces the bluish red, alpha phase regardless of whether the starting material is in the alpha, beta or gamma phase.

Another patent, No. 2,844,485, teaches that milling with an inorganic salt in the presence of an aromatic hydrocarbon or halogenated aromatic hydrocarbon liquid gives the violet, beta phase, again regardless of the starting phase. However, in attempting to follow the teaching of Pat. No. 2,844,485 for preparing the violet or beta phase by grinding with an inorganic salt in the presence of an aromatic hydrocarbon, namely xylene, it has been found that unless the starting material is a beta phase quinacridone, this "conditioning" produces the beta phase only under severe milling conditions.

A third patent, No. 2,844,581, teaches that a similar process using a strong solvent, such as dimethylformamide, produces the red, gamma phase, again regardless of the starting phase.

In accordance with the practice of this invention, it has now been found that the beta phase quinacridone can be produced by milling or grinding with an inorganic salt, preferably sodium chloride, in the presence of a liquid not known in the prior art to be phase directive, or which is taught in the prior art to direct the pigment to a phase other than beta, merely by raising the temperature to the range of 100–175° C., preferably 100–150° C. Whereas it has previously been taught that grinding with salt would produce the alpha phase, it has been found that with increase in temperature to the indicated range, the beta phase is produced regardless of whether a solvent is present or absent. Moreover, it has been found that with the temperatures indicated it is possible to convert quinacridone of any phase to the beta phase even in the presence of a solvent, such as dimethylformamide, which has been reported as effecting formation of the gamma phase.

The time required for milling or grinding depends upon the amount of material being conditioned and the type of apparatus being used. Generally, the period best suited to giving the desired particle size is sufficient. For suitable pigmentary properties, it is desirable that the particles have a size which gives a surface area greater than about 60 square meters per gram (determined according to the nitrogen absorption method of Emmet: "Advances in Colloid Science," vol. 1, 1942).

By using the temperature range specified above, it is possible to avoid the use of a phase-changing solvent. Generally, with laboratory or pilot plant equipment, a milling time of at least 40 hours, preferably at least 48 hours is desirable. Optimum results are obtained with a milling time of 48 to 72 hours. Grinding in excess of 72 hours gives only such slight improvement that it does not warrant the extra time. With more efficient plant size equipment, it is possible to use even shorter periods, possibly as short as 15 hours.

The process of this invention is applicable to all types of linear quinacridones as starting material. However, it is generally preferable to start with an alpha or beta phase since these are the phases generally obtained in the preparation of the linear quinacridone.

The inorganic salt used in the process of this invention can be of various types. Obviously it must be stable against decomposition at the temperatures used for the grinding operation and should be soluble in water or dilute acid so as to be easily removable from the quinacridone. Advantageously it should be one not having water of hydration which will be liberated during the grinding process. Because of its inexpensiveness and availability, sodium chloride is preferred. However, other salts such as potassium chloride, ammonium chloride, ammonium sulfate, sodium sulfate, etc., can be used. These can be of commercial grade, and any absorbed moisture present can be removed by preheating the salt separated from the quinacridone prior to its use.

The proportion of salt to pigment can be varied widely, ranging from 4 to 20 parts of salt per part of pigment. Very satisfactory results are obtained with about 9–10 parts of salt. Smaller amounts of salt require longer milling periods while larger amounts give no added advantage and therefore are less economical.

Various types of mills can be used for the milling or grinding operation provided that they are equipped for maintaining the desired temperature. It is only necessary that in addition to maintaining the temperature, the mill provides the shearing or attrition necessary to produce the desired particle size. For example, a roller mill or an edge-runner mill or ball mill can be used. Various balls, rolls, nails, etc., are advantageously used in addition to the salt for producing the grinding effect. The grinding time will vary according to the particular type of mill and grinding material used.

In most of the examples described below a quart steel jar having a lid thereon sealed by means of a silicone-rubber gasket is used. This is charged with 2500 grams of ⅝ inch diameter SKF balls. Suspended driven rollers or rolls on which the jar is rotated are contained in an oven maintained at the desired milling temperature. For the purpose of this invention, the optimum roll speed has been determined as such that will give the jar a speed of about 106 r.p.m. Generally, however, a speed is used which will give suitable grinding action as determined for optimum ball mill operation. Obviously, other speeds can be used, with appropriate modification of rolling time, etc.

The pigment, after grinding for the period appropriate to give the desired particle size, is separated together with the salt from the grinding balls or rolls, etc., by means of a coarse sieve. The salt is then extracted with a hot dilute aqueous acid. In addition to dissolving the salt, the acid removes any metal that may have been removed from the balls or rolls or the surface of the container.

Various means or methods can be used for supplying the heat and controlling the temperature during the grinding. Most advantageously, small mills are inserted into a furnace or oven maintained at the desired processing temperature, and rotated on driven rolls. However, other means of heating the mill can be provided. For example, radiant or gas flame means can be used for directing heat against the surface of the mill and the supply of heat adjusted according to the temperature recorded by a thermocouple placed at an appropriate position on the mill. In the case of large mills it may be necessary to supply cooling means to keep the temperature below 150° C. Depending on the particular size and conditions of milling, appropriate means are provided to maintain the internal temperature of the mill within the desired range.

U.S. Pat. No. 3,547,926 granted on the above-mentioned parent application claims the process of producing beta-phase quinacridone in the absence of liquid by use of a salt milling temperature of 100–175° C. In accordance with the present invention, it is possible to have present during the conditioning operation solvents of various types, even solvents which at lower temperatures are capable of directing to the formation of other phases. With such other-phase directing solvents it is generally desirable to use a slightly higher temperature or longer grinding period than would normally be used in the absence of such solvent. Obviously, any solvent used must have a boiling point such that there will not be a considerable vapor pressure of the solvent at the temperature used, or provision is advantageously made for sealing the container against loss of solvent vapor.

Typical liquids that can be used in the practice of this invention include, but are not limited to, dimethylformamide, dimethyl sulfoxide, 2-ethylhexanol, formamide, dimethylacetamide, dicyclohexylamine, triethylene tetramine, n-butyl acetate, ethylene glycol, propylene glycol, diethylene glycol, monoalkyl ethers and dialkylethers of glycols and polyglycols such as methyl ether, propyl and butyl ethers of ethylene glycol, diethylene glycol, triethylene glycol and tetraethylene glycol and the corresponding derivatives of propylene glycols, tetrachloro ethylene, diglycolamine, N-amino propyl morpholine, tetraethylene pentamine, monoethanol amine and the like.

The amount of such liquid is at least about 2 percent, preferably at least 10 percent by weight of the pigment and less than the amount that would cause the pigment to form a paste, that is generally less than 40 percent.

Since various types of linear quinacridone starting materials can be used in the process of this invention, it is not critical that the quinacridone be prepared by any particular method or that it be of any particular phase. Various methods of preparing quinacridone are shown in the art. However, since as pointed out above, the methods of production generally give an alpha or beta phase or mixture thereof, the starting material generally comprises such phase or phases. In the examples given below the crude quinacridone is prepared according to the procedure of U.S. Pat. 3,259,630.

The respective phases of the quinacridone are determined primarily by X-ray diffraction patterns. These X-ray patterns are obtained by a well-known powder technique using a Geiger counter to record the intensity of the refractive rays. In measuring these diffraction patterns, the intensities are adjusted so that the most intense band of each pattern is given a value of 100 in order that the respective patterns can be compared. The instrument records the intensity of the diffracted ray on the vertical axis and the angle of diffraction on the horizontal axis with CuK alpha radiation. This angle is converted to interplanar spacing expressed in Angstrom units. These values are accurate within 2% and in most cases the variance is less than 1%. The resultant patterns have certain similarities because of the close identity of the phase but there are characteristic differences which identify the respective phases. These characteristic differences are enumerated above respectively for the alpha, beta and gamma phases.

The invention is best illustrated by the following examples. These examples are given merely for the purpose of illustration and are not intended to limit the scope of the invention nor the manner in which it may be practiced. Parts and percentages are given by weight unless specifically provided otherwise.

EXAMPLE I

The following procedure is used in the various conditioning operations of this invention as referred to in subsequent examples:

The steel quart jar with grinding media, as described above, along with the pigment-salt mixture, are dried thoroughly above 100° C. to remove any residual moisture that may be present. The charge comprises 20 grams of the quinacridone and 180 grams of dry sodium chloride. With the charge dried as mentioned above, the solvent is added and the jar is sealed and placed immediately on the rolls in the oven. The temperature and milling time are indicated in each example. The charge remains free flowing during the entire grinding operation and upon completion of the milling, the contents are discharged upon a coarse sieve which permits passage of the salt and pigment while retaining the SKF balls. The powdered product is dispersed in 500 ml. of water by means of a high speed mixer. The resultant fluid slurry is transferred to a beaker and agitated by means of a sweep type agitator. To this is added sufficient dilute sulfuric acid to yield 1,000 ml. of 5% $H_2SO_4$.

This mixture is heated at 95° C. for thirty minutes after which the solids are filtered on a Buchner funnel and washed to neutrality with water. The filter cake is dispersed in water by mixing in the Waring Blendor for three minutes in sufficient water to yield a fluid slurry. This slurry is returned to the beaker and the water volume increased to 1,000 ml. This is agitated and heated at 95–100° C. for fifteen minutes, after which the solids are again filtered on a Buchner funnel and washed with water. The resultant filter cake generally has a solids content of approximately 30% and is suitable for any further processing desired. Results and characteristics of the respective products are given in the following respective examples.

EXAMPLE II

In this example a number of experiments are performed at different temperatures, in each case using the same crude alpha phase quinacridone and adding 4.3 grams xylene before the jar is closed and sealed. The starting material has the red color characteristic of the alpha crystal phase. The results for the various temperatures are as follows:

Temp. 0° C.:        Results and comments
- Room temp. — No change in properties.
- 50 — No change in properties.
- 75 — Shift in color to violet, starting at 75° C.
- 100 — Improved pigmentary properties and violet color accompanied by considerable gain in tinting strength and darkening in masstone develops at 100° C.
- 125 — Deep violet with 5% gain in tinting strength and the shade becoming duller and bluer.
- 150 — Essentially no additional change between 125° C. and 150° C.

With xylene present the optimum range is 100–125° C. In comparison with the commercial product sold under the trademark "Monastral Violet R," the 100° C. milled pigment of this example is 15% stronger in tinting properties and is comparatively yellow and bright in shade. The 125° C. product of this example is 18% stronger in tinting properties, slightly bluer and slightly brighter in shade than the aforementioned commercial product.

EXAMPLE III

A number of experiments are performed according to the procedure of Example I except that 15 grams of the crude alpha phase quinacridone and 127 grams of salt are used together with 1.6 grams and 3.2 grams respectively of dimethylformamide (DMF) for 24, 48 and 72 hours respectively with the variations in temperature shown below.

In spite of the prior art teaching that the use of DMF in the conditioning of quinacridone produces gamma phase red, the following results show that with the appropriate temperatures, the beta phase violet pigment is produced in each case. It is also noted that with larger amounts of solvent than shown, either a higher temperature or prolonged milling is required to overcome the gamma phase directing effect of the solvent. Nevertheless with the higher temperature or prolonged milling, it is possible to produce a violet beta phase quinacridone in the temperature ranges of this invention. In the column for 10.7% DMF the dashes indicate that no experiment is performed for the indicated milling period.

| Temperature | Milling time, hours | 10.7% DMF (1.6 g./15 g. color) | 21.3% DMF (3.2 g./15 g. color) |
|---|---|---|---|
| Room temperature | 48 | Red | Red. |
|  | 72 | —— | Red. |
| 90° C. | 24 | —— | Red. |
|  | 48 | Red | Red. |
|  | 72 | —— | Reddish violet. |
| 120° C. | 24 | —— | Violet. |
|  | 48 | Violet | Do. |
|  | 72 | —— | Do. |
| 150° C. | 24 | —— | Do. |
|  | 48 | Violet | Do. |
|  | 72 | —— | Do. |

EXAMPLE IV

The procedure of Example I is followed using respectively in two different experiments, beta phase and gamma phase quinacridone with a milling temperature of 150° C. with 5 parts of dimethyl sulfoxide for a period of 72 hours. In each case a similar violet beta phase quinacridone is obtained closely matching the violet product obtained in the preceding examples.

EXAMPLE V

The procedure of Example I is repeated using a temperature of 150° C. and 10% pyridine, based on the amount of alpha quinacridone. The conditioning at 150° C. produces a violet beta phase product similar to that described in the above examples. The thus obtained pigment is dark in masstone and is 24% stronger, appreciable brighter, and slightly bluer in shade than the above-mentioned Monastral Violet R commercial product.

EXAMPLE VI

The procedure of Example V is repeated a number of times with similar results using in place of the pyridine an equal amount respectively of formamide, dimethyl acetamide, 2-ethylhexanol, dicyclohexylamine, triethylene tetramine, n-butyl acetate, Carbowax 400, ethylene glycol, mineral spirits, tetrachloroethylene, diglycolamine, N-aminopropyl morpholine, tetraethylene pentamine and monoethanol amine.

The violet phase quinacridone produced according to the process of this invention is a very durable and stable pigment, and it is very useful where non-bleeding pigments and stability against the elements, particularly light, chemical agents and solvents, are desirable. It is particularly suitable for use in automotive finishes, for coloring linoleum, vinyl plastic and rubber, and for various outside purposes.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for preparing beta crystal phase unsubstituted linear quinacridone pigment characterized by an X-ray diffraction pattern exhibiting five strong lines corresponding to interplanar spacings 15.23 A., 7.55 A., 5.47 A., 4.06 A. and 3.31 A., the lines of interplanar spacings of 15.23 A. and 3.31 A. being much stronger than the others, which process comprises salt milling linear quinacridone in the presence of a liquid, said liquid being a non-solvent for and chemically inert to said pigment and said salt, and having a boiling point above the milling temperature at the pressure existing in the milling apparatus, and selected from the class consisting of dimethylformamide, dimethylsulfoxide, 2-ethylhexanol, formamide, dimethylacetamide, dicyclohexylamine, triethylenetetramine, n-butylacetate, ethyleneglycol, propyleneglycol, diethyleneglycol, the methyl, ethyl, propyl and butyl mono- and diethers of ethyleneglycol, triethyleneglycol, tetraethyleneglycol, dipropyleneglycol, tripropyleneglycol, tetrapropyleneglycol, tetrachloroethylene, diglycolamine, N - aminopropylmorpholine, tetraethylenepentamine, monoethanolamine and mineral spirits, with a water-soluble, inorganic salt, thermally stable and solid at the temperature of said salt milling and selected from the class consisting of ammonium chloride, ammonium sulfate, and alkali metal and alkaline earth metal inorganic salts, at a temperature in the range of 100–175° C. for at least fifteen hours.

2. The process of claim 1 in which said milling is effected at a temperature of 100–125° C.

3. The process of claim 2 in which said salt is sodium chloride.

4. The process of claim 1 in which said salt is sodium chloride.

5. The process of claim 1 in which said temperature is in the range of 125–150° C.

6. The process of claim 5 in which said salt is sodium chloride.

7. The process of claim 1 in which said milling is effected in the presence of dimethyl formamide.

8. The process of claim 1 in which said milling is effected in the presence of dimethyl sulfoxide.

9. The process of claim 1 in which said inorganic salt is a water-soluble inorganic salt, and subsequently removing the salt from the quinacridone by dissolving said salt in an aqueous medium.

10. The process of claim 9 in which said inorganic salt is sodium chloride.

References Cited

UNITED STATES PATENTS

| 2,844,485 | 7/1958 | Struve | 260—279 |
| 3,030,370 | 4/1962 | Jackson | 260—279 |
| 3,176,925 | 4/1965 | Huband et al. | 260—279 X |
| 3,201,051 | 8/1965 | Manger et al. | 260—279 X |
| 3,351,481 | 11/1967 | Hopmeier | 106—288 R |
| 3,534,044 | 10/1970 | Fessler | 260—279 |

DONALD G. DAUS, Primary Examiner